US009162562B2

(12) United States Patent
Bourqui et al.

(10) Patent No.: US 9,162,562 B2
(45) Date of Patent: Oct. 20, 2015

(54) GRILLE SHUTTER ACTUATOR

(71) Applicant: Johnson Electric S.A., Murten (CH)

(72) Inventors: Yvan Bourqui, Corminboeuf (CH); Yan Chappex, Carrouge (CH); Nick Grivas, Windsor (CA)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 14/218,402

(22) Filed: Mar. 18, 2014

(65) Prior Publication Data
US 2014/0284123 A1    Sep. 25, 2014

(30) Foreign Application Priority Data
Mar. 19, 2013  (GB) .................................. 1304992.9

(51) Int. Cl.
*B60K 11/00*     (2006.01)
*B60K 11/08*     (2006.01)

(52) U.S. Cl.
CPC ......... B60K 11/085 (2013.01); *Y10T 74/18568* (2015.01)

(58) Field of Classification Search
CPC ....... B60K 11/085; B60K 11/08; F16H 19/08
USPC .............................. 180/68.1, 68.2, 68.4, 68.6; 123/41.02–41.07; 415/121.2, 220, 222; 137/601.09, 601.14; 165/98; 160/DIG. 1; 296/50, 57.1, 180.5
See application file for complete search history.

(56) References Cited

U.S. PATENT DOCUMENTS

| 4,064,934 | A | * | 12/1977 | Kolthoff et al. | 165/97 |
| 5,215,044 | A | * | 6/1993 | Banzhaf et al. | 123/41.29 |
| 5,732,666 | A | * | 3/1998 | Lee | 123/41.05 |
| 6,145,251 | A | * | 11/2000 | Ricci | 49/82.1 |
| 8,161,919 | B2 | * | 4/2012 | Klotz et al. | 123/41.04 |
| 8,302,715 | B2 | * | 11/2012 | Lee et al. | 180/68.1 |
| 8,505,660 | B2 | * | 8/2013 | Fenchak et al. | 180/68.1 |
| 8,544,581 | B2 | * | 10/2013 | Stokes et al. | 180/68.1 |
| 8,561,738 | B2 | * | 10/2013 | Charnesky et al. | 180/68.1 |
| 8,561,739 | B2 | * | 10/2013 | Hori | 180/68.1 |
| 8,662,569 | B2 | * | 3/2014 | Klop | 296/193.1 |
| 8,720,624 | B2 | * | 5/2014 | Remy et al. | 180/68.1 |
| 2012/0012410 | A1 | | 1/2012 | Hori | |

FOREIGN PATENT DOCUMENTS

| CN | 202156292 U | 3/2012 |
| EP | 2 233 343 B1 | 8/2011 |
| WO | WO 95/21339 A1 | 8/1995 |

* cited by examiner

*Primary Examiner* — James M Dolak
(74) *Attorney, Agent, or Firm* — Muncy, Geissler, Olds & Lowe, P.C.

(57) ABSTRACT

An actuator for opening and closing grille shutters includes a drive unit, a wheel driven by the drive unit, and a pair of shafts attached to the wheel and configured for driving the grille shutters to open or close. At least one of the shafts is pivotally coupled to the wheel so that an angle formed between the shafts and the wheel is adjustable.

18 Claims, 3 Drawing Sheets

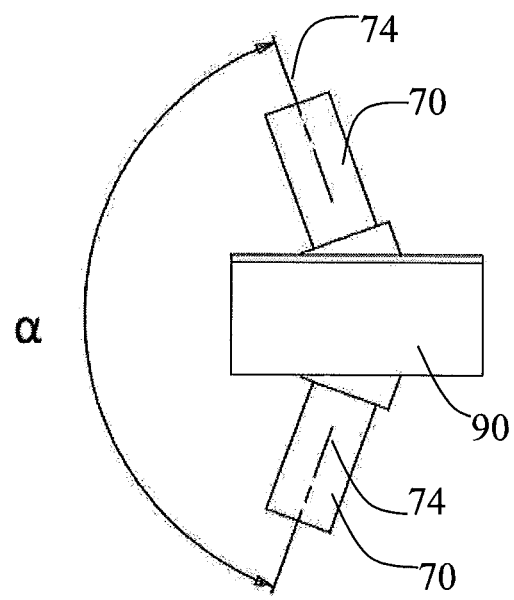
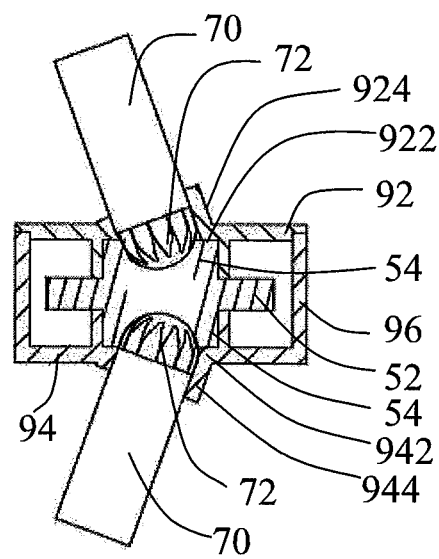
FIG. 5    FIG. 6
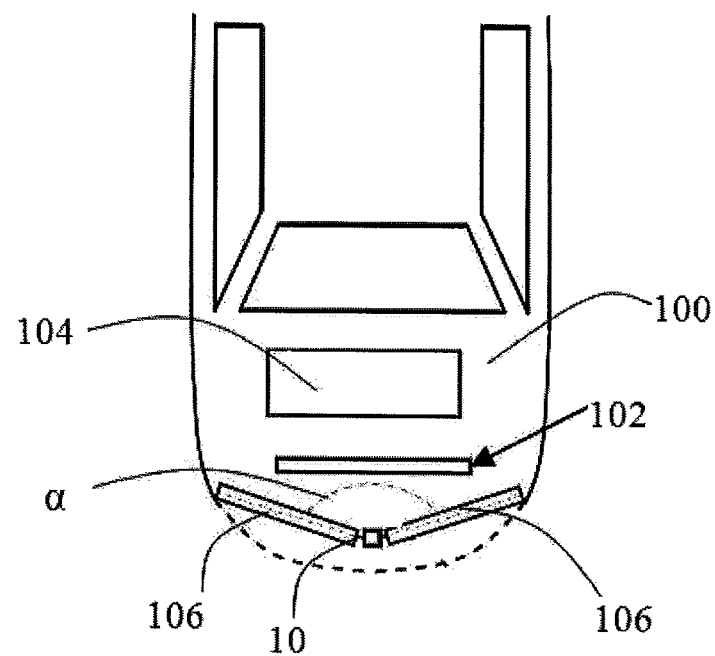
FIG. 7

GRILLE SHUTTER ACTUATOR

CROSS-REFERENCE TO RELATED APPLICATIONS

This non-provisional patent application claims priority under 35 U.S.C. §119(a) from Patent Application No. 1304992.9 filed in United Kingdom on 19 Mar. 2013.

FIELD OF THE INVENTION

This invention generally relates to an actuator for a grille shutter of a heat exchanger and in particular, to an actuator with dual output shafts.

BACKGROUND OF THE INVENTION

A grille shutter actuator is used to open and close louvers of a shutter to control airflow to a heat exchanger or other cooling module. Grille shutters are increasingly being used in vehicles to control the airflow to the various heat exchangers of the vehicle, such as the radiator and the condenser of an air-conditioner. The grille shutters save fuel and thus money by improving the aerodynamics of the vehicle by closing the grille or air intakes when the vehicle is traveling at high speed and engine cooling is not required. Also, by closing the air intakes when the engine is cold, the engine reaches operating temperature faster, where it runs more economically and with less pollution. A dual drive grille shutter actuator has two symmetrical output shafts for driving two sets of shutter louvers located on opposite sides of the actuator. The angle formed between the two output shafts determines the angle of the two sets of shutter louvers. In current dual drive grille shutter actuators, the two output shafts are generally parallel to each other. Thus, the two sets of shutter louvers driven by the current dual drive grille shutter actuators must be parallel to each other. Such dual drive grille shutter actuators are suitable only for a limited range of grille shutters. Currently, grille shutters with sets of louvers that are not co-planar, require the use of individual actuators, increasing the weight and cost of the grille shutter assembly.

Thus, there is a desire for a dual drive actuator for a grille shutter that is suitable for use with a variety of grille shutters.

SUMMARY OF THE INVENTION

Accordingly, in one aspect thereof, the present invention provides an actuator comprising: a drive unit; a wheel driven by the drive unit and having a first connecting part and a second connecting part on opposite sides of the wheel; a first actuation shaft coupled to the first connecting part of the wheel by a first pivotable coupling and configured to rotate in response to the drive unit driving the wheel; and a second actuation shaft coupled to the second connecting part of the wheel and configured to rotate in response to the drive unit driving the wheel.

Preferably, the first pivotable coupling is a universal joint, ball joint or constant velocity joint.

Preferably, the first pivotable coupling comprises a rounded end received in a semi-spherical socket, the rounded end having axially extending teeth in mesh with corresponding teeth formed in the socket, whereby the axis of the first actuation shaft is pivotable with respect to the rotational axis of the wheel and rotation of the wheel causes rotation of the first actuation shaft about its axis:

Preferably, the second actuation shaft is coupled to the second connecting part of the wheel by a second pivotable coupling.

Preferably, the second pivotable coupling is a universal joint, ball joint or constant velocity joint.

Preferably, the second pivotable coupling comprises a rounded end received in a semi-spherical socket, the rounded end having axially extending teeth in mesh with corresponding teeth formed in the socket, whereby the axis of the second actuation shaft is pivotable with respect to the rotational axis of the wheel and rotation of the wheel causes rotation of the second actuation shaft about its axis.

Preferably, the drive unit includes an electric motor with a spindle shaft having a worm; and the wheel includes a plurality of teeth formed at a periphery thereof and meshed with the worm of the spindle shaft.

Preferably, a first positioning member is provided to prevent the first actuation shaft from pivoting relative to the wheel, thereby maintaining a predetermined orientation of the axis of the first actuation shaft with respect to the axis of the wheel.

Preferably, a second positioning member is provided to prevent the second actuation shaft from pivoting relative to the wheel, thereby maintaining a predetermined orientation of the axis of the second actuation shaft with respect to the axis of the wheel.

Preferably, a housing encloses the drive unit and the wheel. Preferably, the housing includes a first end wall having an opening, a second end wall having an opening, and a side wall connecting the first and second end walls; the first and second actuation shafts extend out of the housing via the openings in the first and second end walls, respectively; and an annular flange integrally extending from a periphery of each of the openings, each annular, flange having an axis coaxial with an axis of a respective one of the first and second actuation shafts, whereby maintaining the orientation between the actuation shafts and the wheel.

Preferably, the first actuation shaft and the second actuation shaft are not parallel to each other.

According to a second aspect thereof, the present invention provides a cooling module assembly, comprising: a cooling module having a first portion and a second portion; a first set of shutter louvers adjacent the first portion of the cooling module; a second set of shutter louvers adjacent the second portion of the cooling module; and an actuator as described above, arranged between the first and second sets of shutter louvers, wherein the first actuation shaft is connected to the first set of shutter louvers and the second actuation shaft is connected to the second set of shutter louvers, and the shutter louvers are movable between an open position and a closed position by the actuator.

Preferably, the first set of shutter louvers and the second set of shutter louvers are inclined at an angle with respect to each other.

Preferably, the cooling module and the first and second sets of shutter louvers are installed within a compartment, the first and second sets of shutter louvers are arranged in front of the cooling module, and the width of the compartment gradually decreases towards a front thereof.

In another aspect thereof, the present invention provides an engine assembly, comprising: an engine compartment; an engine installed within the engine compartment; and a cooling module assembly as described above, arranged in front of the engine for cooling the engine.

Preferably, the width of the engine compartment decreases gradually toward a front thereof.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 5 is a plan view of the actuator of FIG. 1;

FIG. 6 is a partial sectional plan view of the actuator of FIG. 1;

FIG. 7 illustrates the actuator of FIG. 1 installed in a vehicle; and

DETAILED DESCRIPTION OF THE PREFERRED EMBODIMENTS

Figure 1:
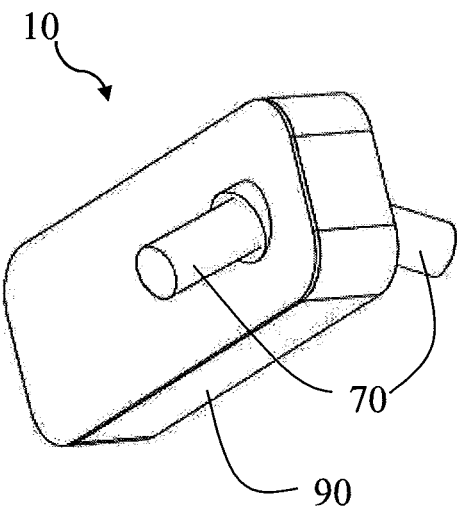
FIG. 1 illustrates an actuator according to a preferred embodiment of the present invention.
Figure 2:
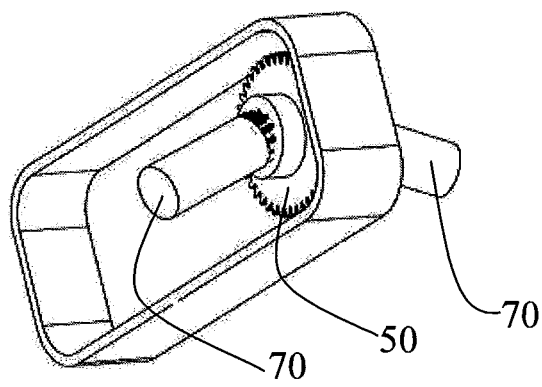
FIG. 2 illustrates the actuator of FIG. 1, with an end wall of a housing removed.
Figure 3:
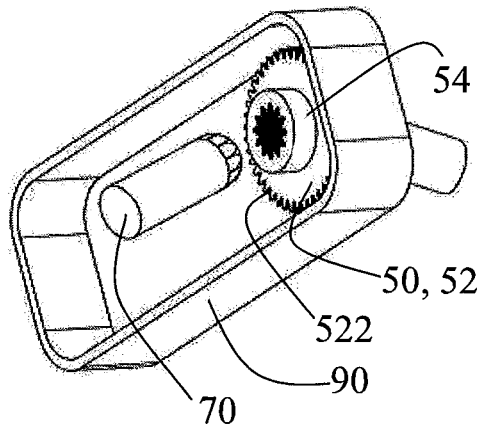
FIG. 3 is a partly exploded view of the actuator of FIG. 2.
Figure 4:
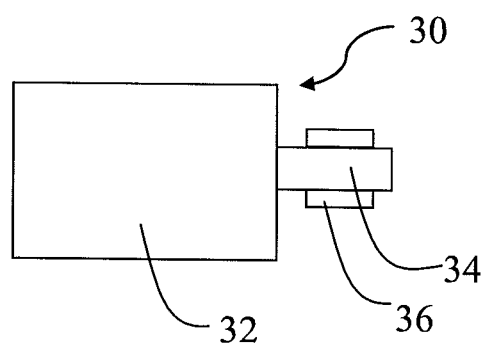
FIG. 4 illustrates a drive unit for driving the actuator of FIG. 1.

Referring to FIGS. 1 to 6, a grille shutter actuator 10 comprises a drive unit 30, a drive wheel 50 driven by the drive unit 30 and a pair of output shafts or actuation shafts 70 connected to wheel 50. In accordance with an embodiment of the present invention, drive unit 30 comprises a motor 32 with a spindle shaft 34, and a worm 36 fixed on shaft 34 such that the worm 36 rotates with shaft 34.

Wheel 50 comprises an annular body 52 and a pair of connecting parts 54 protruding from opposite sides of annular body 52. Annular body 52 comprises a plurality of teeth 522 formed at the periphery thereof. Teeth 522 of annular body 52 are meshed with worm 36 of drive unit 30 so that drive unit 30 is able to drive wheel 50 when motor 32 is powered on.

Each of shafts 70 has one end 72 connected to a corresponding connecting part 54 of wheel 50 such that the shaft 70 rotates with wheel 50. The other ends of shafts 70 are connected to corresponding objects to be driven such as louvers 106 (see FIGS. 7 and 8). When shafts 70 rotate with wheel 50, louvers 106 are open or closed accordingly.

At least one of shafts 70 is pivotal relative to wheel 50 so that an angle formed between an axis 74 of corresponding shafts 70 and an axis of wheel 50 is adjustable. In accordance with a preferred embodiment of the present invention, both shafts 70 are pivotal relative to wheel 50. That is, axis 74 of each shaft 70 is adjustable to be inclined with respect to the axis of wheel 50. An angle α formed between two axes 74 of shafts 70 is adjustable in the range between zero and 180 degrees. Therefore, two actuation shafts 70 may be parallel or non-parallel to each other. The pivotal coupling of actuation shafts 70 to wheel 50 and the variable angle between two actuation shafts 70 broaden the range of applications of actuator 10. In accordance with a specific embodiment of the present invention, the axes of two shafts 70 are coplanar with each other.

Grille shutter actuator 10 further comprises an enclosed housing 90 configured to receive drive unit 30 and wheel 50 therein. Housing 90 comprises a pair of end walls 92, 94, and a sidewall 96 coupled between end walls 92, 94. Sidewall 96 is coupled to the circumference of end walls 92, 94. Shafts 70 protrude out of housing 90 via two openings 922, 942 in end walls 92, 94.

Preferably, the coupling between shafts 70 and corresponding connecting parts 54 of the wheel 50 is realized by means of a pivotable joint, such as a universal or Cardan joint, a type of ball joint or a constant velocity joint. In the preferred embodiment, each pivotable joint comprises a rounded end of a respective shaft received in a semi-spherical socket in the corresponding connecting part. The rounded end has a plurality of axially extending teeth that mate with corresponding teeth formed in the socket. The teeth resemble splines. The pivotable joint allows the shaft to pivot about the rounded end with respect to the axis of the wheel while at the same time being rotated about its axis by rotation of the wheel.

Figure 8:
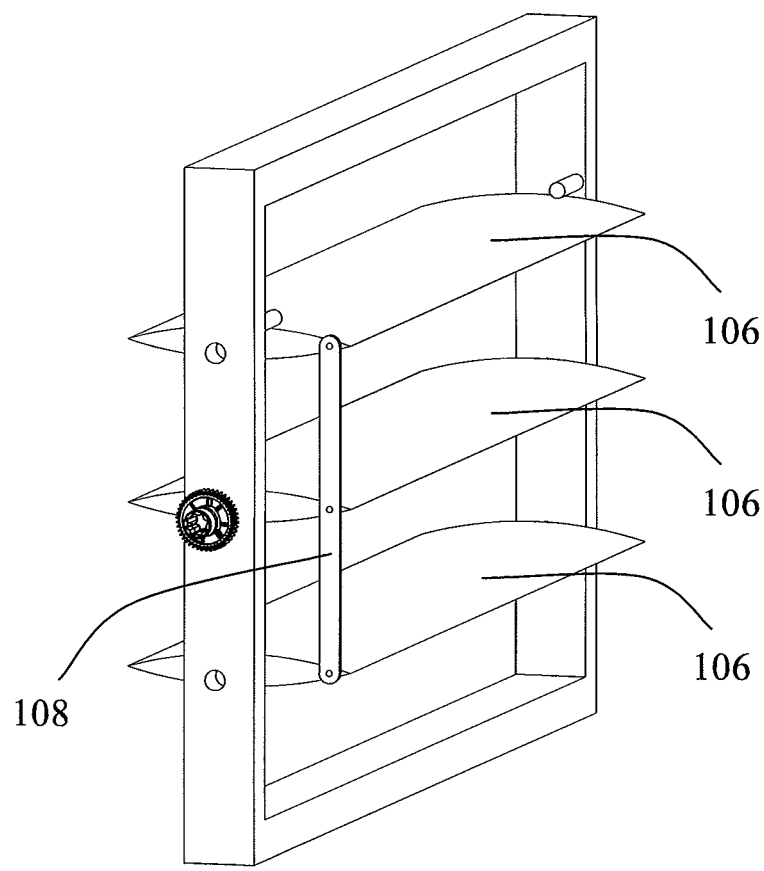
FIG. 8 illustrates a set of shutter louvers driven by the actuator of FIG. 1.

FIG. 7 illustrates grille shutter actuator 10 installed in an engine compartment 100 of a vehicle. The width of engine compartment 100 decreases gradually toward the front. The front of the engine compartment 100 defines air inlets to allow air to flow there through. A cooling module 102 with spaced cooling grilles is installed in the front part of engine compartment 100 in front of an engine 104. Two sets of shutter louvers 106 inclined with respect to each other at an angle are arranged in front of cooling module 102 and aligned with the inlets of the engine compartment 100, each set adjacent to a portion of cooling module 102. As shown in FIG. 8, each set of shutter louvers may comprise a plurality of shutter louvers 106 connected to a connecting rod 108 such that the shutter louvers are moved in unison. Each set of shutter louvers 106 is driven by one of actuation shafts 70 of actuator 10 disposed between two sets of shutter louvers 106. Each shaft 70 of actuator 10 is connected to a corresponding set of shutter louvers 106. The angle formed between the two sets of shutter louvers 106 is equal to the angle formed between axes 74 of shafts 70.

When the motor in drive unit 30 of actuator 10 turns, shafts 70 will open or close two sets of shutter louvers 106 simultaneously to adjust airflow from the front of the vehicle to cooling module 102. Actuator 10 serves to vary opening angles of shutter louvers 106 to adjust the airflow to cooling module 102, thereby controlling the cooling efficiency of cooling module 102. The pivotal couplings of actuation shafts 70 to wheel 50 in actuator 10 make it suitable for use in an engine cooling system installed in a compact engine compartment 100. For a given application, the preferred angle formed between the axis of each actuation shaft 70 and the axis of wheel 50 can be fixed by a positioning member which may be an integral part of the actuator housing 90 or an additional component attached to housing 90 or engine compartment 100. The positioning member is configured to prevent actuation shaft 70 from pivoting relative to wheel 50 to thereby maintain the angle formed between axes of actuation shaft 70 and wheel 50 at a predetermined value. In one specific embodiment, an annular flange 924 or 944 (FIG. 6), which integrally extends from the periphery of a corresponding opening 922 or 924, functions as the positioning member. Each shaft 70 extends through a corresponding annular flange 924, 944. The axis of each annular flange 924 or 944 is inclined with respect to the axis of wheel 50 and preferably coaxial with the axis of the corresponding actuation shaft 70. Preferably, the outer diameter of connecting end 72 of each shaft 70 is substantially equal to the inner diameter of the corresponding annular flange 924 or 944.

Understandably, actuator 10 in accordance with the present invention can also be used in other applications, such as air conditioning condensers, turbo charger intercoolers, or any other heat exchange apparatuses that perform cooling or heating function relying on outside ambient air intake for heat exchanging.

In the present invention, the angle formed between the two shafts in the grille shutter actuator is adjustable such that the actuator may fit a variety of applications where the two sets of louvers to be driven by the shafts are inclined by different angles. Furthermore, the actuator with shafts inclined to each other makes it possible to use two sets of shutter louvers inclined or not parallel to each other in a vehicle with a narrow engine compartment. The two sets of inclined shutter louvers can better match the contour of the front part of a compact engine compartment. Moreover, the actuator is located between two sets of shutter louvers inclined with respect to each other, which results in an increased distance between the actuator and a heat source such as a vehicle radiator/cooling module located behind the shutter louvers, thereby reducing the heat stress on the actuator and the shutter system.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the preferred embodiment shows both actuation shafts as being pivotably coupled to the wheel, a satisfactory arrangement for some applications may require only one of the actuation shafts to be pivotably coupled to the wheel.

Also, while the preferred embodiment shows the pivotable coupling having the rounded end formed on the actuation shafts and the sockets formed in the wheel, the sockets could be formed in the ends of the actuation shafts and the rounded ends formed on the connecting parts of the wheel.

The invention claimed is:

1. An actuator for an engine cooling module, comprising:
a drive unit;
a wheel driven by the drive unit and having a first connecting part and a second connecting part on opposite sides of the wheel;
a first actuation shaft coupled to the first connecting part of the wheel by a first pivotable coupling and configured to rotate in response to the drive unit driving the wheel; and
a second actuation shaft coupled to the second connecting part of the wheel and configured to rotate in response to the drive unit driving the wheel; and further comprising a housing enclosing the drive unit and the wheel, wherein the housing includes a first end wall having an opening, a second end wall having an opening, and a side wall connecting the first and second end walls; the first and second actuation shafts extend out of the housing via the openings in the first and second end walls, respectively; and an annular flange integrally extending from a periphery of each of the openings, each annular flange having an axis coaxial with an axis of a respective one of the first and second actuation shafts, whereby maintaining predetermined orientation of the axes of the first and second actuation shafts with respect to a rotational axis of the wheel.

2. The actuator of claim 1, wherein the first pivotable coupling is a universal joint, ball joint or constant velocity joint.

3. The actuator of claim 1, wherein:
the first connecting part of the wheel comprises a socket having a plurality of inner teeth;
the first pivotable coupling comprises a rounded end with a plurality of axially extending outer teeth; and
the rounded end of the first pivotable coupling is received in the socket with the outer teeth of the rounded end in mesh with the inner teeth of the socket, whereby an axis of the first actuation shaft is pivotable with respect to a rotational axis of the wheel and rotation of the wheel causes rotation of the first actuation shaft about its axis.

4. The actuator of claim 1, wherein the second actuation shaft is coupled to the second connecting part of the wheel by a second pivotable coupling.

5. The actuator of claim 4, wherein the second pivotable coupling is a universal joint, ball joint or constant velocity joint.

6. The actuator of claim 4, wherein:
the second connecting part of the wheel comprises a socket having a plurality of inner teeth;
the second pivotable coupling comprises a rounded end with a plurality of axially extending outer teeth; and
the rounded end of the second pivotable coupling is received in the socket and the outer teeth of the rounded end are in mesh with the inner teeth of the socket, whereby an axis of the second actuation shaft is pivotable with respect to a rotational axis of the wheel and rotation of the wheel causes rotation of the second actuation shaft about its axis.

7. The actuator of claim 1, wherein
the drive unit comprises an electric motor with a spindle shaft having a worm; and
the wheel includes a plurality of teeth formed at a periphery thereof and meshed with the worm of the spindle shaft.

8. The actuator of claim 1, further comprising a first positioning member configured to prevent the first actuation shaft from pivoting relative to the wheel, thereby maintaining a predetermined orientation of an axis of the first actuation shaft with respect to a rotational axis of the wheel.

9. The actuator of claim 4, further comprising a second positioning member configured to prevent the second actuation shaft from pivoting relative to the wheel, thereby maintaining the orientation of axes of the second actuation shaft and the wheel in a predetermined position.

10. The actuator of claim 1, wherein the first actuation shaft and the second actuation shaft are unparallel to each other.

11. A cooling module assembly, comprising:
a cooling module having a first portion and a second portion;
a first set of shutter louvers adjacent the first portion of said cooling module;
a second set of shutter louvers adjacent the second portion of said cooling module; and
an actuator of claim 1 arranged between said first and second sets of shutter louvers,
wherein the shutter louvers are moveable between an open position and a closed position by the first and second actuation shafts which are rotatable with said wheel in response to said drive unit driving said wheel.

12. The cooling module assembly claim 11, wherein the first set of shutter louvers and the second set of shutter louvers are inclined at an angle with respect to each other.

13. The cooling module assembly of claim 11, wherein the first end of said second actuation shaft is coupled to the second connecting part of said wheel by a second pivotable coupling.

14. The cooling module assembly of claim 11, further comprising a compartment, wherein:
the cooling module and the first and second sets of shutter louvers are installed within the compartment;
the first and second sets of shutter louvers are arranged in front of the cooling module; and
the width of the compartment gradually decreases towards a front thereof.

15. An engine assembly, comprising:
an engine compartment;
an engine installed within the engine compartment;
a cooling module arranged in front of said engine for cooling the engine;
first and second sets of shutter louvers in front of said cooling module and inclined at an angle with respect to each other; and
an actuator of claim 1 disposed between said first and second sets of shutter louvers.

16. The engine assembly of claim 15, wherein at least one of the first ends of the first and second actuation shafts is coupled to said drive wheel by a pivotable coupling.

17. The engine assembly of claim 16, wherein the actuator further comprises a positioning member configured to prevent said at least one of the first ends of the first and second actuation shafts from pivoting relative to the wheel, thereby maintaining a predetermined orientation of an axis of the at least one of the first and second actuation shafts with respect to a rotational axis of said drive wheel.

18. The engine assembly of claim 15, wherein the width of the engine compartment decreases gradually toward the front thereof.

* * * * *